US011067684B2

(12) United States Patent
Kilian et al.

(10) Patent No.: US 11,067,684 B2
(45) Date of Patent: Jul. 20, 2021

(54) LOCALIZATION BASED ON TELEGRAM SPLITTING

(71) Applicants: Fraunhofer-Gesellschaft zur Förderung der angewandten Forschung e.V., Munich (DE); Friedrich-Alexander-Universitaet Erlangen-Nuernberg, Erlangen (DE)

(72) Inventors: Gerd Kilian, Erlangen (DE); Niels Hadaschik, Erlangen (DE); Marc Faßbinder, Erlangen (DE); Josef Bernhard, Erlangen (DE); Jörg Robert, Uttenreuth (DE); Jörn Thielecke, Erlangen (DE); Markus Hartmann, Sulzbach-Rosenberg (DE); Hans-Martin Tröger, Erlangen (DE); Ferdinand Kemeth, Erlangen (DE)

(73) Assignees: Fraunhofer-Gesellschaft zur Förderung der angewandten Forschung e.V.; Friedrich-Alexander-Universitaet Eriangen-Nuemberg ( * ) Notice: Subject to any disclaimer, the term of this patent is extended or adjusted under 35 U.S.C. 154(b) by 10 days.

(21) Appl. No.: 16/369,216

(22) Filed: Mar. 29, 2019

(65) Prior Publication Data
US 2019/0227158 A1 Jul. 25, 2019

Related U.S. Application Data

(63) Continuation of application No. PCT/EP2017/068504, filed on Jul. 21, 2017.

(30) Foreign Application Priority Data

Sep. 30, 2016 (DE) .......................... 102016219093.8

(51) Int. Cl.
G01S 13/84 (2006.01)
H04W 64/00 (2009.01)
(Continued)

(52) U.S. Cl.
CPC ................ *G01S 13/84* (2013.01); *G01S 5/00* (2013.01); *G01S 5/02* (2013.01); *G01S 11/08* (2013.01);
(Continued)

(58) Field of Classification Search
None
See application file for complete search history.

(56) References Cited

U.S. PATENT DOCUMENTS 5,583,517 A 12/1996 Yokev et al.
6,243,587 B1 * 6/2001 Dent ........................ G01S 5/06
342/457
(Continued)

FOREIGN PATENT DOCUMENTS

DE 102009060592 A1 7/2010
DE 102009060592 B4 6/2012
(Continued)

OTHER PUBLICATIONS

G. Kilian, H. Petkov, R. Psiuk, H. Lieske, F. Beer, J. Robert, and A. Heuberger, "Improved Coverage for Low-Power Telemetry Systems using Telegram Splitting", in Proceedings of 2013 European Conference on Smart Objects, Systems and Technologies (SmartSysTech), Jun. 11-12, 2013.
(Continued)

*Primary Examiner* — Whitney Moore
(74) *Attorney, Agent, or Firm* — Haynes and Boone, LLP

(57) ABSTRACT

Embodiments provide a data receiver with a unit for receiving sub-data packets configured to receive at least two sub-data packets from a data transmitter, and to combine the
(Continued)

at least two sub-data packets to obtain a data packet that is transmitted split into the at least two sub-data packets by the data transmitter, wherein each of the at least two sub-data packets is shorter than the data packet, a unit for receiving sub-data packets configured to receive the at least two sub-data packets on at least two different carrier frequencies a unit for determining a phase difference configured to determine a phase difference between the at least two sub-data packets that is caused by the at least two different carrier frequencies and the path delay, and a unit for determining a distance difference configured to determine a distance difference between the data receiver and the data transmitter based on the determined phase difference between the at least two sub-data packets.

22 Claims, 8 Drawing Sheets

(51) Int. Cl.
    *H04L 5/00*     (2006.01)
    *G01S 5/00*     (2006.01)
    *G01S 11/08*     (2006.01)
    *G01S 5/02*     (2010.01)

(52) U.S. Cl.
    CPC .............. *H04L 5/001* (2013.01); *H04W 64/00* (2013.01); *H04Q 2209/40* (2013.01)

(56) References Cited

U.S. PATENT DOCUMENTS

| | | | |
|---|---|---|---|
| 6,731,908 | B2 | 5/2004 | Berliner et al. |
| 7,405,696 | B2 | 7/2008 | Kennedy, Jr. et al. |
| 8,116,817 | B2 | 2/2012 | Noll et al. |
| 8,125,388 | B2 | 2/2012 | Kennedy, Jr. et al. |
| 8,363,768 | B2 | 1/2013 | Patino-Studencka et al. |
| 8,712,475 | B2 | 4/2014 | Noll et al. |
| 2008/0187063 | A1 | 8/2008 | Yu et al. |
| 2011/0006942 | A1 | 1/2011 | Kluge et al. |

FOREIGN PATENT DOCUMENTS

| | | |
|---|---|---|
| DE | 102011082098 A1 | 3/2013 |
| JP | 2001524277 A | 11/2001 |
| JP | 2002-504664 A | 2/2002 |
| WO | WO0201247 A2 | 1/2002 |
| WO | WO2012061479 A1 | 5/2012 |
| WO | WO2017202459 A1 | 11/2017 |

OTHER PUBLICATIONS

Chaabane, M.; Biebl, E.M., "A Tag Complexity Reduction Approach for Code-Based Cooperative Ranging Systems", Positioning Navigation and Communication (WPNC), 2013 10th Workshop on , vol. No. pp. 1,7, Mar. 20-21, 2013.
L. Schuchman, "Dither Signals and Their Effect on Quantization Noise", IEEE Trans. Communications 12, pp. 162-165, Dec. 1964.
Kalverkamp, Gerrit; Schaffer, Bernhard; Biebl, Erwin, "Nonuniform Stepped Frequency Radar Scheme Reducing Spectrum Occupancy and Data Acquisition Time", German Microwave Conference (GeMIC), 2014, vol. No. pp. 1,4, Mar. 10-12, 2014.
Kalverkamp, G.; Schaffer, B.; Biebl, E., "OFDM-Based Ranging Approach for Vehicular Safety Applications", Vehicular Technology Conference (VTC Fall), 2013 IEEE 78th , vol. No. pp. 1,5, Sep. 2-5, 2013.
Fock, G.; Schulz-Rittich, P.; Schenke, A.; Meyr, H., „Low Complexity High Resolution Subspace-Based Delay Estimation for DS-CDMA, IEEE International Communications Conference, ICC 2002.
N. Hadaschik, B. Sackenreuter, M. Schäfer and M. Faßbinder, "Direct Positioning with Multiple Antenna Arrays," 2015 International Conference on Indoor Positioning and Indoor Navigation (IPIN), Banff, Canada, 2015.
Office Action dated Jul. 28, 2020 issued in the parallel Japanese patent application No. 2019-517785 (12 pages).
Office Action (Decision to Grant) dated Apr. 15, 2021 issued in the parallel Korean patent application No. 10-2019-7011838 (8 pages).

* cited by examiner

LOCALIZATION BASED ON TELEGRAM SPLITTING

CROSS-REFERENCES TO RELATED APPLICATIONS

This application is a continuation of co-pending International Application No. PCT/EP2017/068504, filed Jul. 21, 2017, which is incorporated herein by reference in its entirety, and additionally claims priority from German Application No. DE 102016219093.8, filed Sep. 30, 2016, which is incorporated herein by reference in its entirety.

BACKGROUND OF THE INVENTION

Embodiments of the present invention refer to a data receiver. Further embodiments refer to a communication system with a data transmitter and at least one data receiver. Some embodiments refer to localization based on telegram splitting.

DE 10 2009 060 592 B4 describes a method for measuring the distance between two nodes using a frequency hopping method (e.g. from IEEE802.15.4). In this case, two nodes A and B change their local oscillator (LO) frequencies at the same distance Δf. Both nodes transmit data packets (ideally a sinus tone/wave) to each other on different frequencies and then internally determine a first value relative to the carrier phase. Then, both frequencies are switched by Δf and a second value is determined, respectively. The distance is determined from the difference of the two phase values. Quartz tolerances cancel each other out in the calculation if the temporal distances of the transmissions are equal. To reduce the multipath propagation, several measurements are performed in the entire band and the channel impulse response is calculated via IFFT in order to determine the first receive signal.

DE 10 2011 082 098 describes telegram splitting. Here, telegrams are split to several sub-packets. Such a sub-packet is referred to as a hop. Several information symbols are transferred in a hop. The hops are transmitted in the so-called frequency hopping method at a frequency or split across several frequencies. Between the hops, there are pauses in which no transmission takes place. See also [G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013].

Furthermore, a retransmission of messages is known. In an Aloha method or a Slotted Aloha method, messages are transmitted at a random point in time from a sensor node to the base station. As a result, collisions occur with several participants in a network. In order to reduce the collision probability, the message may be transmitted repeatedly. This repeated transmission of the message may also take place on different frequencies (frequency hopping).

SUMMARY

According to an embodiment, a data receiver may have: a unit for receiving sub-data packets, configured to receive at least two sub-data packets from a data transmitter and to combine the at least two sub-data packets to obtain one data packet with data that is transmitted split into the at least two sub-data packets by the data transmitter, wherein each of the at least two sub-data packets is shorter than the data packet, wherein the unit for receiving sub-data packets is configured to receive the at least two sub-data packets on at least two different carrier frequencies; a unit for determining a phase difference, configured to determine a phase difference between the at least two sub-data packets that is caused by the at least two different carrier frequencies and the path delay; and a unit for determining a distance difference between the data receiver and the data transmitter based on the determined phase difference between the at least two sub-data packets); wherein the data receiver knows the at least two different carrier frequencies or a frequency interval between the at least two different carrier frequencies; wherein the unit for receiving sub-data packets is configured to receive the at least two sub-data packets at least at two different reception times; wherein the data receiver knows the at least two different reception times or a temporal interval between the at least two different reception times; wherein an interval between the at least two reception times is at least large enough so that the at least two sub-data packets are received temporally spaced apart from each other.

According to another embodiment, a communication system may have: a data transmitter with a unit for generating sub-data packets, configured to split a data packet with data into at least two sub-data packets, wherein each of the at least two sub-data packets is shorter than the data packet, and a unit for transmitting sub-data packets, configured to transmit the at least two sub-data packets to the data receiver on at least two different carrier frequencies; a data receiver with a unit for receiving sub-data packets, configured to receive the at least two sub-data packets from the data transmitter and to combine the at least two sub-data packets to obtain the data packet with data that is transmitted split into the at least two sub-data packets by the data transmitter, wherein the unit for receiving sub-data packets is configured to receive the at least two sub-data packets on at least two different carrier frequencies; a unit for determining a phase difference, configured to determine a phase difference between the at least two sub-data packets that is caused by the at least two different carrier frequencies and the path delay; and a unit for determining a distance difference between the data receiver and the data transmitter based on the determined phase difference between the at least two sub-data packets; wherein the unit for transmitting data packets is configured to transmit the at least two sub-data packets at least at two different transmission times so that the at least two sub-data packets are temporally spaced apart from each other.

According to another embodiment, a communication system may have: a data transmitter with a unit for generating sub-data packets, configured to split a data packet with data into at least two sub-data packets, wherein each of the at least two sub-data packets is shorter than the data packet, and a unit for transmitting sub-data packets, configured to transmit the at least two sub-data packets to the data receiver on at least two different carrier frequencies; a data receiver with a unit for receiving sub-data packets, configured to receive the at least two sub-data packets from the data transmitter and to combine the at least two sub-data packets to obtain the data packet with data that is transmitted split into the at least two sub-data packets by the data transmitter, wherein the unit for receiving sub-data packets is configured to receive the at least two sub-data packets on at least two different carrier frequencies; a further data receiver with a further unit for receiving sub-data packets, configured to receive the at least two sub-data packets from the data transmitter, and to combine the at least two sub-data packets to obtain the data packet that is transmitted split into the at least two sub-data packets by the data transmitter, wherein the further unit for receiving sub-data packets is configured to receive the at least two sub-data packets on at least two different carrier frequencies; a unit for determining a phase difference, configured to determine a phase difference between the at least two sub-data packets that is caused by the at least two different carrier frequencies and the path delay, wherein the unit for determining the phase difference or a further unit for determining a phase difference is configured to determine a further phase difference between the at least two sub-data packets that is caused by the at least two different carrier frequencies; wherein the communication system has a unit for determining a position of the data transmitter, configured to determine a position of the data transmitter based on the determined phase difference and the determined further phase difference; wherein the data receiver and the further data receiver are temporally synchronized.

According to another embodiment, a method may have the steps of: receiving with a data receiver at least two sub-data packets that are transmitted by a data transmitter on at least two different carrier frequencies; combining the at least two sub-data packets to obtain a data packet with data that is transmitted split into the at least two sub-data packets by the data transmitter, wherein each of the at least two sub-data packets is shorter than the data packet; determining at the data receiver a phase difference between the at least two sub-data packets that is caused by the at least two different carrier frequencies and the path delay; and determining a distance difference between the data receiver and the data transmitter based on the determined phase difference between the at least two sub-data packets; where the at least two different carrier frequencies or a frequency interval between the at least two different carrier frequencies is known; wherein the at least two sub-data packets are received at least at two different reception times; where the at least two different reception times or a temporal interval between the at least two different reception times is known; wherein an interval between the at least two different reception times is at least large enough so that the at least two sub-data packets are received temporally spaced apart from each other.

Another embodiment may have a non-transitory digital storage medium having a computer program stored thereon to perform the method having the steps of: receiving with a data receiver at least two sub-data packets that are transmitted by a data transmitter on at least two different carrier frequencies; combining the at least two sub-data packets to obtain a data packet with data that is transmitted split into the at least two sub-data packets by the data transmitter, wherein each of the at least two sub-data packets is shorter than the data packet; determining at the data receiver a phase difference between the at least two sub-data packets that is caused by the at least two different carrier frequencies and the path delay; and determining a distance difference between the data receiver and the data transmitter based on the determined phase difference between the at least two sub-data packets; where the at least two different carrier frequencies or a frequency interval between the at least two different carrier frequencies is known; wherein the at least two sub-data packets are received at least at two different reception times; where the at least two different reception times or a temporal interval between the at least two different reception times is known; wherein an interval between the at least two different reception times is at least large enough so that the at least two sub-data packets are received temporally spaced apart from each other, when said computer program is run by a computer.

Embodiments provide a data receiver with a unit for receiving sub-data packets, a unit for determining a phase difference and a unit for determining a distance difference. The unit for receiving sub-data packets is configured to receive at least two sub-data packets from a data transmitter and to combine the at least sub-data packets to obtain a data packet transmitted split into the at least two sub-data packets by the data transmitter, wherein each of the at least two sub-data packets is shorter than the data packet, wherein the unit for receiving sub-data packets is configured to receive the at least two sub-data packets on at least two different carrier frequencies. The unit for determining a phase difference is configured to determine a phase difference between the at least two sub-data packets that is caused by the at least two different carrier frequencies and the path delay. The unit for determining a distance difference between the data receiver and the data transmitter is configured to determine the distance difference based on the determined phase difference between the at least two sub-data packets.

Further embodiments provide a communication system with a data transmitter and a data receiver. The data transmitter includes a unit for generating sub-data packets, configured to split a data packet into at least two sub-data packets, wherein each of the at least two sub-data packets is shorter than the data packet, and a unit for transmitting sub-data packets, configured to transmit the at least two sub-data packets on at least two different carrier frequencies. The data receiver includes a unit for receiving sub-data packets, a unit for determining a phase difference and a unit for determining a distance difference. The unit for receiving sub-data packets is configured to receive at least two sub-data packets from a data transmitter and to combine the at least sub-data packets to obtain a data packet transmitted split into the at least two sub-data packets by the data transmitter, wherein each of the at least two sub-data packets is shorter than the data packet, wherein the unit for receiving sub-data packets is configured to receive the at least two sub-data packets on at least two different carrier frequencies. The unit for determining a phase difference is configured to determine a phase difference between the at least two sub-data packets that is caused by the at least two different carrier frequencies and the path delay. The unit for determining a distance difference between the data receiver and the data transmitter is configured to determine the distance difference based on the determined phase difference between the at least two sub-data packets.

Further embodiments provide a method for determining a distance difference between a data transmitter and a data receiver. The method includes a step of receiving with a data receiver at least two sub-data packets transmitted by a data transmitter on at least two different carrier frequencies. Furthermore, the method includes a step of combining the at least two sub-data packets to obtain a data packet transmitted split into the at least two sub-data packets by the data transmitter, wherein each of the at least two sub-data packets is shorter than the data packet. Furthermore, the method includes a step of determining of a phase difference between the at least two sub-data packets at the data receiver that is caused by the at least two different carrier frequencies and the path delay. Furthermore, the method includes a step of determining a distance difference between the data receiver and the data transmitter based on the determined phase difference between the at least two sub-data packets.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
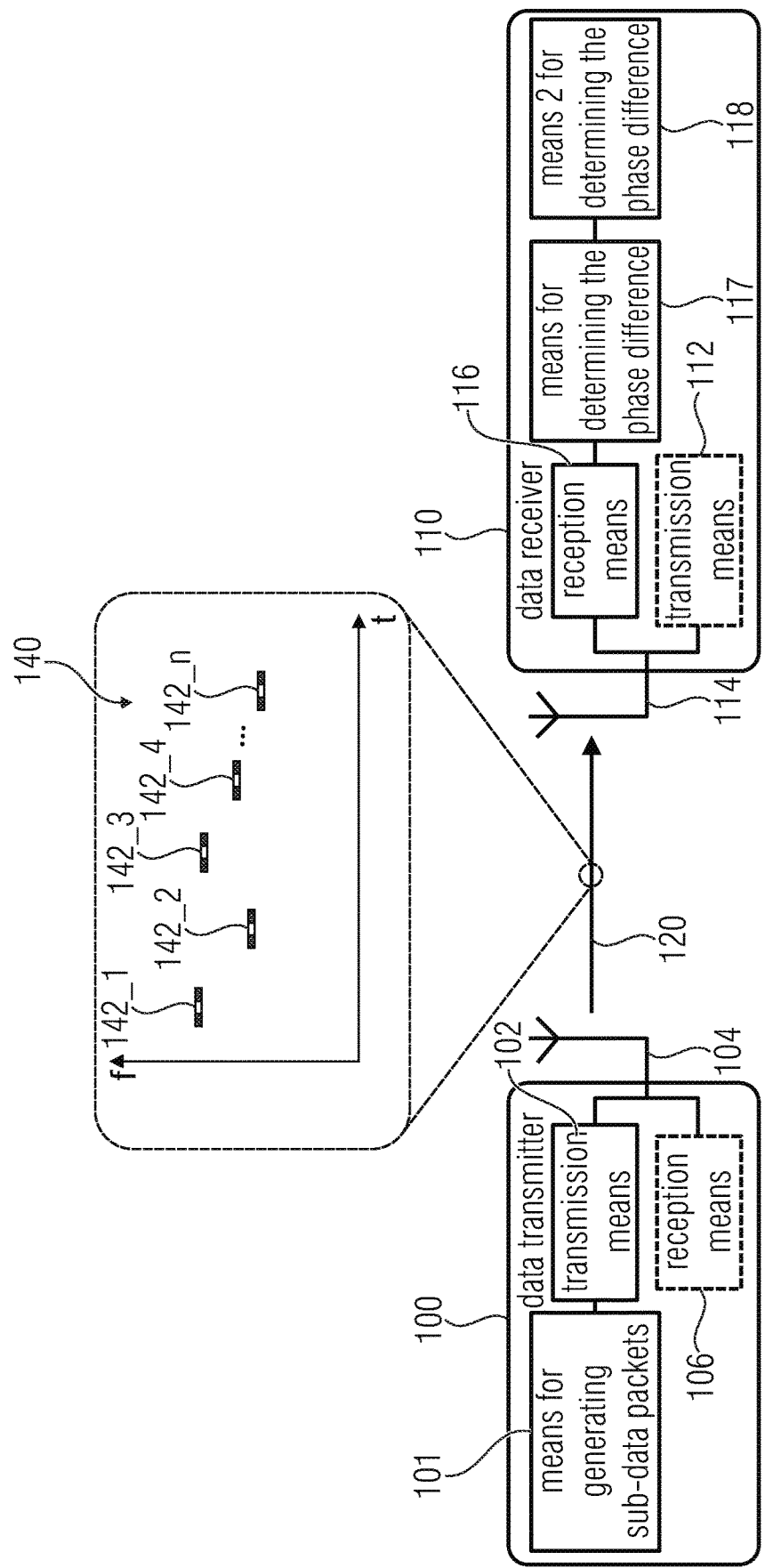
FIG. 1 shows a schematic block circuit diagram of a system having a data transmitter and a data receiver according to an embodiment.

In the subsequent description of the embodiments of the present invention, same elements or elements having the same effect are indicated in the figures with the same reference numerals so that their description is interchangeable.

FIG. 1 shows a schematic block circuit diagram of a communication system 180 with a data transmitter 100 and a data receiver 110 according to an embodiment.

The data transmitter 100 includes a unit for generating sub-data packets 142_1 to 142_n, configured to split a data packet into at least two sub-data packets 142_1 to 142_n (n≥2), wherein each of the at least two sub-data packets 142_1 to 142_n is shorter than the data packet, and a unit (transmission unit) 102 for transmitting sub-data packets, configured to transmit the at least two sub-data packets 142_1 to 142_n to the data receiver 110 on at least two different carrier frequencies.

The data receiver 110 includes a unit (reception unit) 116 for receiving sub-data packets, a unit 117 for determining a phase difference and a unit 118 for determining a distance difference.

The unit 116 for receiving sub-data packets is configured to receive the at least two sub-data packets 142_1 to 142_n from the data transmitter 100 and to combine the at least two sub-data packets 142_1 to 142_n in order to obtain the data packet that is transmitted split into the at least two sub-data packets 142_1 to 142_n by the data transmitter 100, wherein each of the at least two sub-data packets 142_1 to 142_n is shorter than the data packet, wherein the unit 116 for receiving sub-data packets is configured to receive the at least two sub-data packets 142_1 to 142_n on the at least two different carrier frequencies.

The unit 117 for determining a phase difference is configured to determine a phase difference between the at least two sub-data packets 142_1 to 142_n that is caused by the at least two different carrier frequencies and the path delay.

The unit 118 for determining a distance difference between the data receiver 110 and the data transmitter 100 is configured to determine the distance difference based on the determined phase difference between the at least two sub-data packets 142_1 to 142_n.

As is exemplarily shown in FIG. 1, the data transmitter 100 may comprise transmission unit 102 configured to transmit the plurality of sub-data packets 142_1 to 142_n. For example, the transmission unit 102 may be a transmission module or a transmitter. The unit 101 for generating sub-data packets may be implemented in the transmission module or the transmitter. The transmission unit 102 may be connected to an antenna 104 of the data transmitter 100. The data transmitter 100 may optionally comprise a reception unit (or reception module, or receiver) 106 configured to receive data (e.g. a data packet or a plurality of sub-date packets. The reception unit 106 may be connected to the antenna 104 or a further (separate) antenna of the data transmitter 100. The data transmitter 100 may also comprise a combined transmitting/reception unit (transceiver).

The data receiver 110 may comprise a reception unit 116 configured to receive data 120. For example, the reception unit 116 may be a reception module or a receiver. The unit 117 for determining the phase difference and/or the unit 118 for determining the distance difference may also be implemented in the reception module or the receiver. The reception unit 116 may be connected to an antenna 114 of the data receiver 110. Optionally, the data receiver 110 may comprise a transmission unit (or transmitting module, or transmitter) 112 configured to transmit data (e.g. a data packet or a plurality of sub-data packets). The transmission unit 112 may be connected to the antenna 114 or a further (separate) antenna of the data receiver 110. The data receiver 110 may also comprise a combined transmission/reception unit (transceiver).

In embodiments, the data transmitter 100 may be a sensor node, while the data receiver 110 may be a base station. Typically, a communication system 180 includes at least one data receiver 110 (base station) and a multitude of data transmitters (sensor nodes, e.g. such as heating meters). Obviously, it is also possible that the data transmitter 100 is a base station, while the data receiver 110 is a sensor node. Furthermore, it is possible that the data transmitter 100 and the data receiver 110 are sensor nodes. In addition, it is also possible that the data transmitter 100 and the data receiver 110 are base stations.

The data transmitter 100 and the data receiver 110 may be configured to transmit and receive, respectively, data 120 by using the telegram splitting method. Here, a telegram, or a data packet, is split into a plurality of sub-data packets (or partial data packets, or partial packets) 142_1 to 142_n and the sub-data packets 142_1 to 142_n are transmitted by the data transmitter 100 to the data receiver 110 distributed in time and/or distributed in frequency according to a hopping pattern 140, wherein the data receiver 110 joins (or combines) the sub-data packets to obtain the data packet. Each of the sub-data packets 142_1 to 142_n contains only a part of the data packet. The data packet may further be channel-coded so that not all sub-data packets 142_1 to 142_n are needed for the error-free decoding of the data packet, but only a part of the sub-data packets 142_1 to 142_n.

As previously mentioned, the temporal distribution of the multitude of sub-data packets 142 may be carried out according to a time and/or frequency hopping pattern.

A time hopping pattern may indicate a sequence of transmission times or transmission time intervals with which the sub-data packets 142_1 to 142_n are transmitted. For example, a first sub-data packet 142_1 may be transmitted at a first transmission time (or in a first transmission time slot) and a second sub-data packet 142_2 may be transmitted at a second transmission time (or in a second transmission time slot), wherein the first transmission time and the second transmission time are different. The time hopping pattern may define (or specify, or indicate) the first transmission time and the second transmission time. Alternatively, the time hopping pattern may indicate the first transmission time and a temporal interval between the first transmission time and the second transmission time. Obviously, the time hopping pattern may also only indicate the temporal interval between the first time and the second transmission time. Transmission pauses in which nothing is transmitted may be present between the sub-data packets 142_1 to 142_n. The sub-data packets 142_1 to 142_n may also temporally overlap (intersect).

A frequency hopping pattern may indicate a sequence of transmission frequencies or transmission frequency hops with which the sub-data packets 142_1 to 142_n are transmitted. For example, a first sub-data packet 142_1 may be transmitted with a first transmission frequency (or in a first frequency channel), and a second sub-data packet 142_2 may be transmitted with a second transmission frequency (or in a second frequency channel), the first transmission frequency and the second transmission frequency being different. The frequency hopping pattern may define (or specify, or indicate) the first transmission frequency and the second transmission frequency. Alternatively, the frequency hopping pattern may indicate the first transmission frequency and a frequency interval (transmission frequency hop) between the first transmission frequency and the second transmission frequency. Obviously, the frequency hopping pattern may also only indicate the frequency interval (transmission frequency hop) between the first transmission frequency and the second transmission frequency.

Obviously, the plurality of sub-data packets 142_1 to 142_n may also be transmitted by the data transmitter 100 to the data receiver 110 distributed in time and in frequency. The distribution of the plurality of data packets 142_1 to 142_n in time and in frequency may be carried out according to a time/frequency hopping pattern. A time/frequency hopping pattern may be a combination of a time hopping pattern and a frequency hopping pattern, i.e. a sequence of transmission times or transmission time intervals with which the sub-data packets 142_1 to 142_n are transmitted, wherein transmission frequencies (or transmission frequency hops) are associated to the transmission times (or transmission time intervals).

Figure 2:
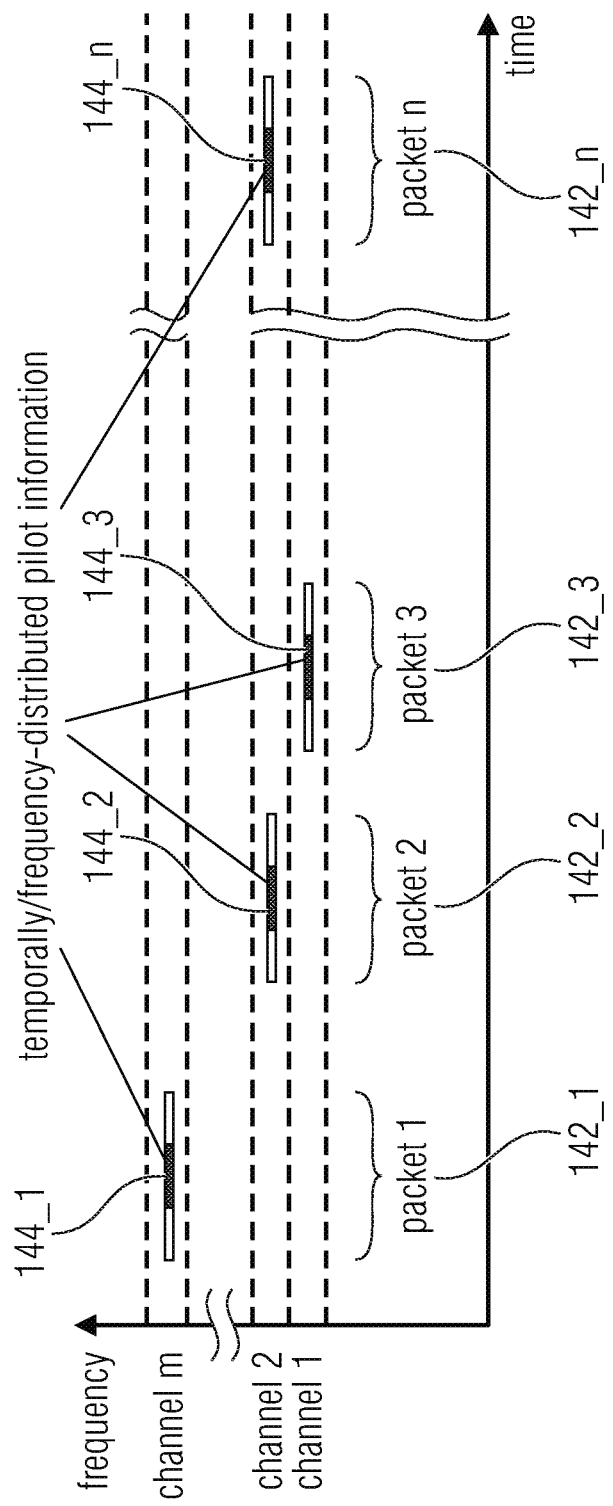
FIG. 2 shows in a diagram an occupancy of the transmission channel during transmission of a data packet using the telegram splitting method.

FIG. 2 shows in a diagram an occupancy of the transmission channel during transmission of a data packet using the telegram splitting method. The ordinate describes the frequency and the abscissa describes the time.

As can be seen in FIG. 2, the data packet may be distributed to the plurality of sub-data packets 142_1 to 142_n and be transmitted by the data transmitter 100 to the data receiver 110 distributed in time (e.g. in different time slots) and frequency (e.g. in different frequency channels) according to a time/frequency hopping pattern.

As can further be seen in FIG. 2, a synchronization sequence (or pilot sequence) may be distributed to the plurality of sub-data packets 142_1 to 142_n so that the plurality of sub-data packets 142_1 to 142_n each include a partial synchronization sequence (or partial pilot sequence) 144_1 to 144_n.

Figure 3:
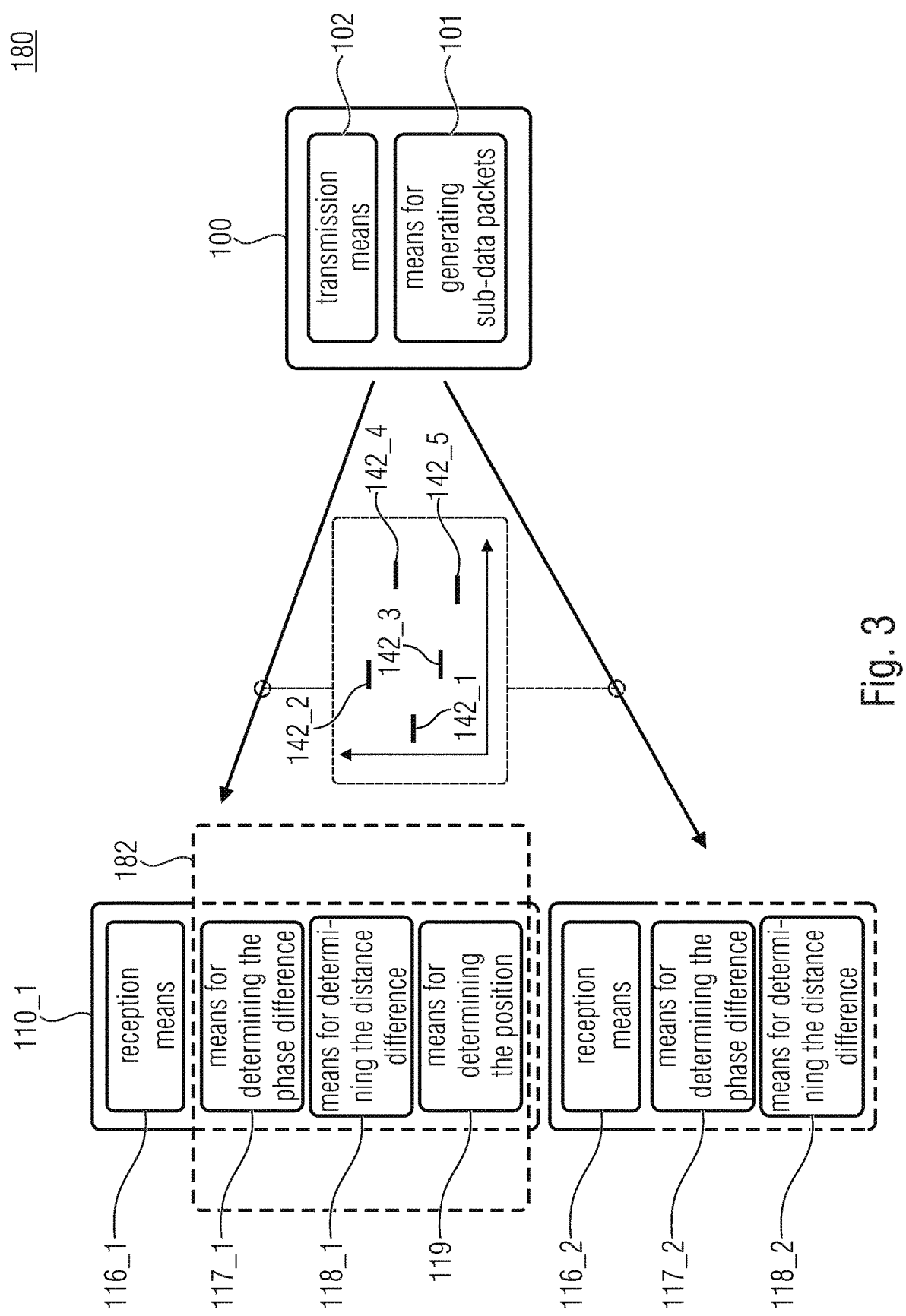
FIG. 3 shows a schematic view of a communication system with one data transmitter and two data receivers according to an embodiment.

FIG. 3 shows a schematic view of a communication system 180 with a data transmitter 100 and two data receivers 110_1 and 110_2 according to an embodiment.

The data transmitter 100 includes a unit for generating sub-data packets 142_1 to 142_n, configured to split a data packet into at least two sub-data packets 142_1 to 142_n (n≥2), wherein each of the at least two sub-data packets 142_1 to 142_n is shorter than the data packets, and a unit (transmission unit) 102 for transmitting sub-data packets, configured to transmit the at least two sub-data packets 142_1 to 142_n to the data receiver 110 on at least two different carrier frequencies.

The first data receiver 110_1 includes a unit (reception unit) 116_1 for receiving sub-data packets, configured to receive the at least two sub-data packets 142_1 to 142_n by the data transmitter 100 and to combine the at least two sub-data packets 142_1 to 142_n to obtain the data packet that is transmitted split into the at least two sub-data packets 142_1 to 142_n by the data transmitter 100, wherein each of the at least two sub-data packets 142_1 to 142_n is shorter than the data packet, wherein the unit 116_1 for receiving sub-data packets is configured to receive the at least two sub-data packets 142_1 to 142_n on the at least two different carrier frequencies.

Furthermore, the communication system 180 includes a unit 117_1 for determining a phase difference, configured to determine a phase difference between the at least two sub-data packets 142_1 to 142_n that is caused by the at least two different carrier frequencies and the path delay.

Furthermore, the communication system 180 includes a unit 118_1 for determining a distance difference between the data receiver 110 and the data transmitter 100, configured to determine the distance difference based on the determined phase difference between the at least two sub-data packets 142_1 to 142_n.

In embodiments, the first data receiver 110_1 may include the unit 117_1 for determining a phase difference and/or the unit 118_1 for determining a distance difference. Alternatively, the communication system 180 may comprise a central processing unit 182 including the unit 117_1 for determining a phase difference and/or the unit 118_1 for determining a distance difference.

The second data receiver 110_2 may also comprise a unit 116_2 for receiving sub-data packets, configured to receive the at least sub-data packets 142_1 to 142_n from the data transmitter 100 and to combine the at least two sub-data 142_1 to 142_n to obtain the data packet that is transmitted split into the at least two sub-data packets by the data transmitter 100, wherein the unit 116_2 for receiving sub-data packets is configured to receive the at least two sub-data packets on at least two different carrier frequencies.

The unit 117_1 for determining the phase difference (e.g. of the first data receiver 110_1 or of the central processing unit 182) or a further unit 117_2 for determining a phase difference (e.g. of the second data receiver 110_2) may be configured to determine a further phase difference between the at least two sub-data packets that is caused by the at least two different carrier frequencies.

The unit 118_1 for determining a distance difference (e.g. of the data receiver 110_1 or the central processing unit 182) or a further unit 118_2 for determining a distance difference (e.g. of the second data receiver 110_2 may be configured to determine a further distance difference between the second data receiver 110_2 and the data transmitter 100 based on the determined further phase difference between the at least two sub-data packets 142_1 to 142_n.

In embodiments, the communication system 180 may comprise a unit 119 for determining a position of the data transmitter 100, configured to determine a position of the data transmitter 100 based on the determined phase difference and on the determined further phase difference.

The unit 119 for determining a position of the data transmitter 100 may either be integrated into one of the two data receivers 110_1 and 110_2 or may be integrated into the central processing unit 182 of the communication system 180.

In the following, detailed embodiments of the data transmitter 100 and the data receiver 110 (or the two data receivers 110_1 and 110_2) are described in more detail.

As an example, it is assumed that the communication system 180 with a data transmitter 100 and a data receiver 110 shown in FIG. 1 is a LPWA (Low-Power Wide-Area) network with synchronized base stations 110 (advantageously via GPS with an accuracy in the range of 15 ns). Several base stations 110 receive the transmission signal 120 of a sensor node (data transmitter, e.g. a tag with a sensor) 100 which may be implemented in a unidirectional or bidirectional manner. The sensor node 100 may transmit its data 120 distributed on several frequencies.

However, the subsequent description may also be applied to other communication systems than the LPWA network. Furthermore, the subsequent description may also be applied to other implementations of the data transmitter 100 and the data receiver 110. Thus, the data receiver 110 is not restricted to implementations as a (synchronized) base station, while the data transmitter 100 is not restricted to implementations as a sensor node.

Frequency Sweep with Steps

Figure 4A:
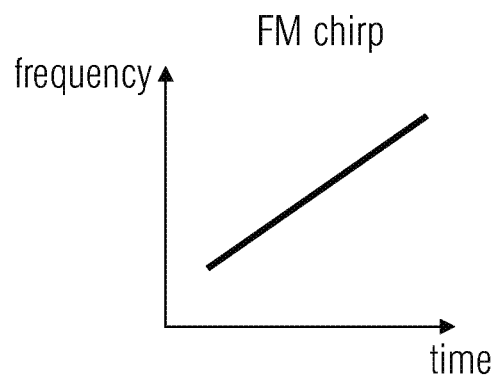
FIG. 4a shows in a diagram a signal comprising a linear frequency increase.
Figure 4B:
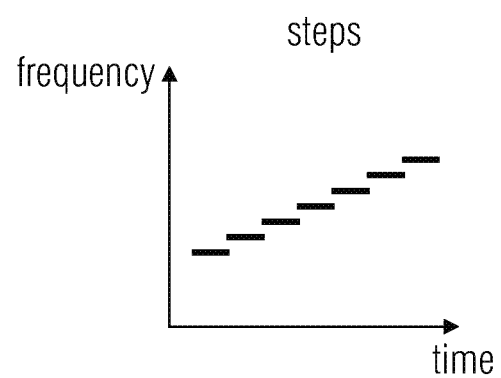
FIG. 4b shows in a diagram a signal comprising a stepped frequency increase.

Instead of transmitting a signal having a linear frequency increase, as is shown in FIG. 4a as an example, in embodiments, the sensor node 100 may be configured to transmit a signal having a stepped frequency increase, or an abrupt frequency increase (frequency hops 142_1 to 142_7), as is shown in FIG. 4b. In detail, FIG. 4a shows in a diagram a signal having a linear frequency increase (frequency chirp or FM chirp), while FIG. 4b shows in a diagram a signal having a stepped frequency increase. In FIGS. 4a and 4b, the ordinate describes the frequency and the abscissa describes the time.

In contrast to the signal having the linear frequency increase shown in FIG. 4a, the signal having the stepped frequency increase shown in FIG. 4b has the advantage that it may be generated by many commercially available telemetry chips. Furthermore, the signal has the advantage that it is possible to operate, or transmit, coherently within the steps. In addition, this signal has the advantage that, by using many frequencies, multipath propagations may be detected and/or removed.

Telegram Splitting

Figure 5:
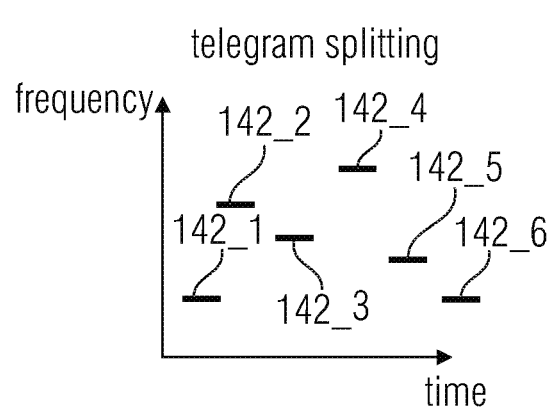
FIG. 5 shows in a diagram a signal having its frequency hops distributed in time, according to an embodiment.

In embodiments, the sensor node 100 may further be configured to distribute steps of the signal having the stepped frequency increase shown in FIG. 4b in time and in frequency, as is shown in FIG. 5. In detail, FIG. 5 shows in a diagram a signal in which the frequency changes in an abrupt manner. In FIG. 5, the ordinate describes the frequency and the abscissa describes the time.

The sensor node 100 may also be configured to transmit a signal comprising a plurality of frequency hops 142_1 to 142_6, wherein transmission pauses in which the data transmitter 100 does not transmit are present between the frequency hops 142_1 to 142_6. Each of the frequency hops 142_1 to 142_6 may comprise a different frequency, or be transmitted in a different frequency channel. In order to obtain the plurality of frequency hops 142_1 to 142_6, the data transmitter may change its carrier frequency, for example.

Furthermore, the sensor node 100 may be configured to transmit in each of the plurality of frequency hops 142_1 to 142_6 one of the plurality of sub-data packets.

In embodiments, the sensor node 100 may also be configured to transmit the plurality of sub-data packets to the data receiver 110 on different carrier frequencies.

In contrast to the signal having the stepped frequency increase shown in FIG. 4b, the signal having the frequency hops that are distributed in time and in frequency shown in FIG. 5 has the advantage that it is robust due to the temporal diversity. Furthermore, this signal has the advantage that a simple interference detection may be carried out due to the transmission pauses. With this, a coordinated transmission of the telemetry nodes is not possible, the localization system becomes robust and may also be operated in uncoordinated bands having high duty cycles of the interference.

Several Hops at the Band Edges

Figure 7:
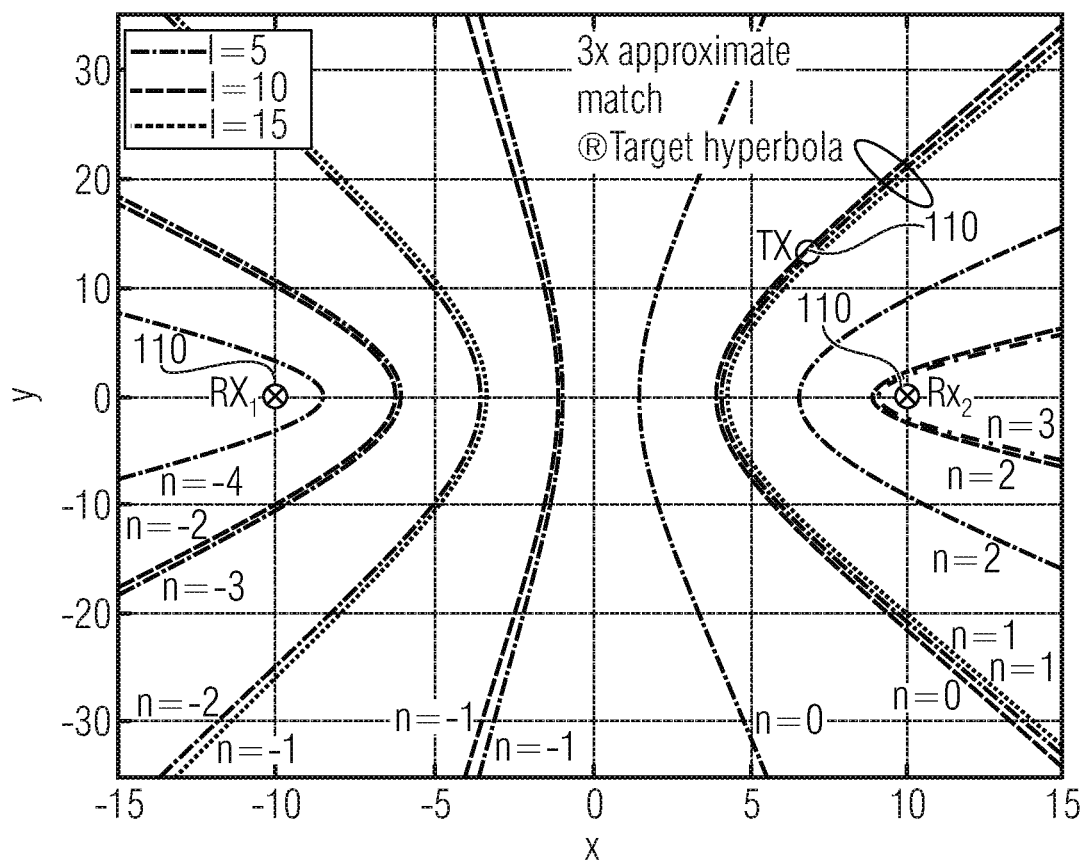
FIG. 7 shows in a diagram a position of a sensor node, the positions of two base stations 110 as well as three hyperbola groups created by ambiguous phase difference measurements, according to an embodiment.

In embodiments, the sensor node 100 may further be configured to transmit the plurality of sub-data packets 142_1 to 142_6 on different carrier frequencies, wherein at least a part of the different carrier frequencies is adjacent to frequency edges of a frequency band used for the transfer, as is shown in FIG. 7.

Figure 6:
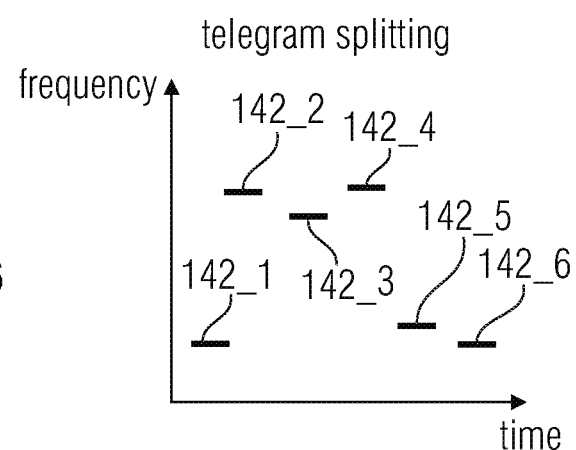
FIG. 6 shows in a diagram a distribution of the plurality of sub-data packets on different carrier frequencies in such a way that parts of the different carrier frequencies are adjacent to frequency edges of the frequency band used for the transmission, according to an embodiment.

FIG. 6 shows in a diagram a distribution of the plurality of sub-data packets 142_1 to 142_6 on different carrier frequencies in such a way that a part of the different carrier frequencies is adjacent to frequency edges of the frequency band used for transfer. The ordinate describes the frequency and the abscissa describes the time.

The carrier frequencies being adjacent to the frequency edges of the frequency band may refer to the fact that a frequency distance between the carrier frequencies and the respective frequency edge is smaller than a distance between the carrier frequencies and a band center.

More hops (sub-data packets) being arranged at the band edges has the advantage of a higher localization accuracy. According to the Cramér-Rao bound, more signal energy at the band edges increases the localization accuracy. Equally-distributed energy increases the multipath resolution.

Selective Energy-Distributed Placement of the Sub-Data Packets

In embodiments, the sensor node may be configured to transmit two or more data packets distributed on a plurality of sub-data packets, wherein the sub-data packets of the two or more data packets may be differently distributed in time and/or frequency such that the sub-data packets of one of the data packets are arranged closer to the band edges in order to increase a localization accuracy of the sensor node 100 and such that the sub-data packets of another of the data packets are arranged closer to the band center in order to increase a resolution of a multipath detection.

In other words, according to the requirements or in principle, the transmitter may transmit two or more differently distributed telegrams. Packets with energy in the band edges serve for increased localization accuracy; other telegrams distributed in the spectrum serve for a better multipath resolution. It is conceivable to carry out this distribution in an adaptive manner (based on current measurements but also based on historic measurements), i.e.

when detecting a scenario having few multipaths based on the consideration of several distributed sub-bands, only or mostly the band edges are occupied in future transfers.

Irregular Distribution of the Hops in Time and Frequency

It is known from theory that irregular distributions of sample values partly allow for a better energy efficiency and bandwidth efficiency. Among other things, an increased estimation accuracy (smaller mean arrow squares) may be achieved with linear antennas and with an irregular distribution of the antenna elements at the same total aperture, as compared to an even distribution. Analogously to the antenna distribution, distributions in time and/or frequency (to improve the time resolution) may be considered here.

The analogy with respect to the direction estimation using linear group antennas indicates that an irregular distribution in time slots and frequency sub-bands also enables a trade-off of accuracy and multipath resolution with the same signal energy. There are studies on the introduction of artificial jitter of the sampling, e.g. [Chaabane, M.; Biebl, E. M., "A tag complexity reduction approach for code-based cooperative ranging systems," Positioning Navigation and Communication (WPNC), 2013 10th Workshop on, vol., no., pp. 1,7, 20-21 March 2013.] and [L. Schuchman, "Dither signals and theft effect on quantization noise," IEEE Trans. Communications 12, pp. 162-165, December 1964]. Here, a jitter of the packet start may also be used to smooth out a quantization, for example.

However, this makes works from the context of compressive/compressed sensings, or compressive/compressed samplings, which use the artificial jitter, relevant to the parameter reconstruction. Further related aspects are pulse position modulation of UWB systems, for example.

Works such as [Kalverkamp, Gerrit; Schaffer, Bernhard; Biebl, Erwin, "Nonuniform Stepped Frequency Radar Scheme Reducing Spectrum Occupancy and Data Acquisition Time," Microwave Conference (GeMIC), 2014 German, vol., no., pp. 1,4, 10-12 March 2014.], [Kalverkamp, G.; Schaffer, B.; Biebl, E., "OFDM-Based Ranging Approach for Vehicular Safety Applications," Vehicular Technology Conference (VTC Fall), 2013 IEEE 78th, vol., no., pp.1,5, 2-5 September 2013.] indicate advantages of irregular signal distribution in the spectrum for the propagation time estimation.

In embodiments, the base station (data receiver) 110 may determine a difference phase through the known frequency hop $\Delta f$ as is described in the following.

The transmitter 100 may transmit a carrier or a narrowband modulated signal at each frequency hop k with a frequency $f_k$ and an unknown arbitrary phase $\varphi_{TX,k}$.

For the time t, the following applies for the carrier:

$$s_k(t) = \begin{cases} \exp(j[2\pi f_k t + \varphi_{TX,k}]) & \forall\, t_k < t < t_{k-1} - T_G \\ 0 & \text{otherwise} \end{cases}$$

Here, $t_k$ may be the starting time of the k-th frequency hop interval and $T_G$ may be the protection interval which allows the frequency synthesis in the transmitter 100 (and with a partially analog realization, in the receiver 110) to settle (loop settling time). In the telegram splitting method, the protection interval $T_G$ may typically be larger than the duration of the transmission of a hop (sub-data packet).

The overall signal may then result via:

$$s(t) = \sum_{k=1}^{K} s_k(t)$$

The receiver 110 may now mix the overall signal across all frequency hops into the base band based on a mutual center frequency $f_{C,m} = f_C$ (also of all receivers) with the reception phase $\varphi_{RX,m}$.

In the receiver 110 m the noisy signal $$r_m(t) = \beta_m s(t - \tau_m)\exp(j[-2\pi f_C t + \varphi_{RX,m}]) + w_m(t)$$

may now be present. Here, $w_m(t)$ may be an additive noise and $\beta_m > 0$ may be the path loss.

From knowing (or detecting) the hop pattern, the individual bursts (sub-data packets) may be extracted:

$$r_{k,m}(t) = \begin{cases} \beta_m \exp(j[2\pi(f_k - f_C)t + 2\pi f_k \tau_m + \varphi_{TX,k} + \varphi_{RX,m}]) + w_m(t) & \forall\, t_k < t < t_{k-1} - T_G \\ w_m(t) & \text{otherwise} \end{cases}$$

In the digital base band, the remaining frequency deviation may be compensated so that only the temporally constant phase terms remain. Alternatively, the phase may directly be estimated based on the known frequency deviation. Here, instead of the phase $\phi$, the phasor $p = \exp(j\phi)$ is estimated (the two are fundamentally equivalent):

$$p_{k,m} = \begin{cases} \beta_m \exp(j[2\pi f_k \tau_m + \varphi_{TX,k} + \varphi_{RX,m}]) + w_{m,k} & \forall\, t_k + \tau_m < t < t_{k-1} + \tau_m - T_G \\ w_m(t) & \text{otherwise} \end{cases}$$

The distance information, or delay information, may be determined based on forming a difference, or the conjugate complex multiplication:

$$\Delta p_{k_1 k_2, m} = p_{k_1, m} \cdot p^*_{k_2, m} \approx \exp(j\phi_{k_1, m}) \cdot \exp(-j\phi_{k_2, m}) = \exp(j[\phi_{k_1, m} - \phi_{k_2, m}])$$

With this, the mutual phase influence of the receiver $\varphi_{RX,m}$ may be eliminated:

$$\phi_{k_1, m} - \phi_{k_2, m} = 2\pi(f_{k_1} - f_{k_2})\tau_m + \varphi_{TX,k_1} - \varphi_{TX,k_2}.$$

With a propagation path, a phase ramp results which is falsified by an arbitrarily distributed phase $\varphi_{TX,k}$. These $\Delta p_{k_1 k_2, m}$ are collected in the receivers 110:

$$\begin{pmatrix} \Delta p_{12,m} \\ \Delta p_{13,m} \\ \vdots \\ \Delta p_{1K,m} \end{pmatrix} = \begin{pmatrix} 2\pi(f_1 - f_2)\tau_m + \varphi_{TX,1} - \varphi_{TX,2} \\ 2\pi(f_1 - f_3)\tau_m + \varphi_{TX,1} - \varphi_{TX,3} \\ \vdots \\ 2\pi(f_1 - f_K)\tau_m + \varphi_{TX,1} - \varphi_{TX,K} \end{pmatrix} + \begin{pmatrix} v_{m,1} \\ v_{m,2} \\ \vdots \\ v_{m,K} \end{pmatrix}$$

The $v_{m,k}$ model a noise term of the estimation of the $\Delta p_{12,m}$.

These are forwarded to a central processing unit (other combinations of the carrier frequencies are also possible, however, they have to be able to be ascribed to the above, e.g. $\Delta p_{23,m} = \Delta p_{12,m} \cdot \Delta p^*_{13,m}$).

However, by means of forming a further difference with the phasors (or phases) of a next receiver, this phase may be eliminated:

$$\Delta\Delta p_{k_1 k_2, m_1, m_2} =$$

$$\Delta p_{k_1 k_2, m_1} \cdot \Delta p^*_{k_1 k_2, m_2} \approx \exp(j2\pi(f_{k_1} - f_{k_2}) \cdot (\tau_{m_1} - \tau_{m_2})) + \begin{pmatrix} v_{m,1} \\ v_{m,2} \\ \vdots \\ v_{m,K} \end{pmatrix}$$

This results in the remaining noise term $u_{m,k}$.

From the phases, e.g., an ambiguous propagation time difference, or distance difference, may be derived. Methods for this would be frequency estimators (for estimating the dominant delay) and sub-space methods such as MUSIC or ESPRIT.

With the addition of at least one further (third) receiver and considering possible ambiguities, one or more possible 2D positions may be determined, e.g., based on a hyperbola localization. For 3D positions, at least four receivers are needed, for example.

The consideration of amplitudes or additional directional information (e.g. by means of the directional estimation based on the measurement values of an antenna array at the receivers 110_1 and 110_") may also support the resolution of ambiguities.

The calculation via the phasors has the advantage of shifting the resolution of ambiguities, or errors, to the back in the signal processing chain through wrapping effects so that it only has to be performed once. However, in comparison to the direct phase consideration, the multiplicative processing involved leads to a noise increase.

The ambiguity of the distance differences is defined from the minimal frequency difference:

$$\Delta f_{\min} = \min_{k_1, k_2} \{f_{k_1} - f_{k_2}\}, \text{ so dass } d_{amb} = \frac{c_0}{\Delta f_{\min}}.$$

The subsequent table exemplarily lists distance ambiguities $d_{amb}$ depending on the minimal frequency difference $\Delta f_{min}$:

| $\Delta f_{min}$ | $d_{amb}$ |
|---|---|
| 1 kHz | 300 km |
| 10 kHz | 30 km |
| 100 kHz | 3 km |
| 1 MHz | 300 m |
| 10 MHz | 30 m |

The central processing unit may be located in one of the receivers or in an external server or, if applicable, in the mobile transmitter if the mobile device is extended by a reception unit and the distributed reception devices are extended by a transmission unit.

This phase difference is proportional to the propagation time, or to the distance between the sensor node 100 and the base station 110, if the frequency hop of the transmission frequency f_1 to f_2 may occur coherently in the sensor node 100. Since the transmissions do not occur at the same time, a phase offset t results due to the transient process when switching the PLL in the sensor node 100 and due to the time offset when transmitting the two transmission signals of different frequencies. If this phase offset is not known in the base station 110, the signal propagation time cannot be calculated from the difference phase.

If applicable, the offset of the phase position may be calculated once for the chip for each frequency and, if applicable, also through the temperature. For example, the calibration is carried out via an additional SDR chip on the sensor node 100.

Since the origin of this phase offset lies in the sensor node 100, it occurs equally in all base stations 110. That is why this offset may be calculated by means of subtraction of phase differences of different bases stations 110 and may be compensated during the propagation time calculation.

The distribution of the telegram parts in the frequency results in main areas between which a trade-off may occur. Signals that are evenly (equidistantly) distributed on the spectrum result in a good resolution of multipaths and minimize the occurrence of ambiguities (signals that are not equidistantly but on average evenly, but quasi-randomly, distributed on the spectrum enable an even better resolution but are more difficult to handle with respect to computation). Signals that are concentrated at the band gaps enable a more accurate estimation of the delay of strongly dominant paths (e.g. in pure AWGN, a power distribution entirely on the band edges is optimal). In principle, however, any distribution of the transmission frequencies may be used.

FIG. 7 shows in a diagram a position of a sensor node 110 (TX), the positions of two base stations 110 (RX) as well as curves showing three hyperbola groups. These are caused by the ambiguity of the phase difference measurement with respect to a distance difference.

Signals with three differently normed wavelengths (5, 10, 15, or the corresponding carrier frequencies) are used for this. The interaction in the diagram (or in the abstract interpretation) allows to resolve the ambiguity and to select the hyperbola (which approximately occurs several times) on which the transmitter (TX) is located. The x and y axes span the space to be covered by the communication system, in which the transmitter TX is also being located. In other words, FIG. 7 shows an ambiguity resolution based on multi-frequency signals.

A requirement of the above mentioned process is a time synchronization that is as accurate as possible with respect to the starting time of the channel sampling of the base stations 110, wherein the (standard) deviation of the temporal synchronization $$\sigma_{\Delta T} \ll \frac{d_{res}}{c_0}$$

is based on the desired spatial resolution $d_{res}$.

The subsequent table lists the spatial resolution $d_{res}$ depending on the temporal synchronization $\sigma_{\Delta T}$:

| $d_{res}$ | $\sigma_{\Delta T}$ |
|---|---|
| 10 cm | ≪0.33 ns |
| 1 m | ≪3.3 ns |
| 10 m | ≪33 ns |

Furthermore, the frequency generation in the transmitter 100 should be stable to such an extent that the phase may be calculated by averaging over the carrier of a frequency hop: $\Delta_{\varphi TX}(t) \ll 2\pi \forall t_k < t < t_{k-1} - T_G$. However, it is also possible to estimate the phase via a model of the temporally instable oscillator.

In embodiments, it is assumed that the oscillator in the transmission node (data transmitter 100) is quasi static for a short time, i.e., during the transmission of a frequency hop.

In turn, the frequency generation in the receiver 110 should be stable to such an extent that $\varphi_{RX,m}(t) \ll 2\pi$ remains across all considered frequency hops, since the calculation of the phase ramp (across the frequency) may otherwise be falsified. Alternative, if applicable, modelling and compensation of the phase change may also be performed (U.S. Pat. No. 8,363,768).

In embodiments, it is assumed that the oscillator in the receiver node (data receiver) 110 is quasi static in the medium/long term.

System Overview of Telemetry in Connection with Localization

Figure 8:
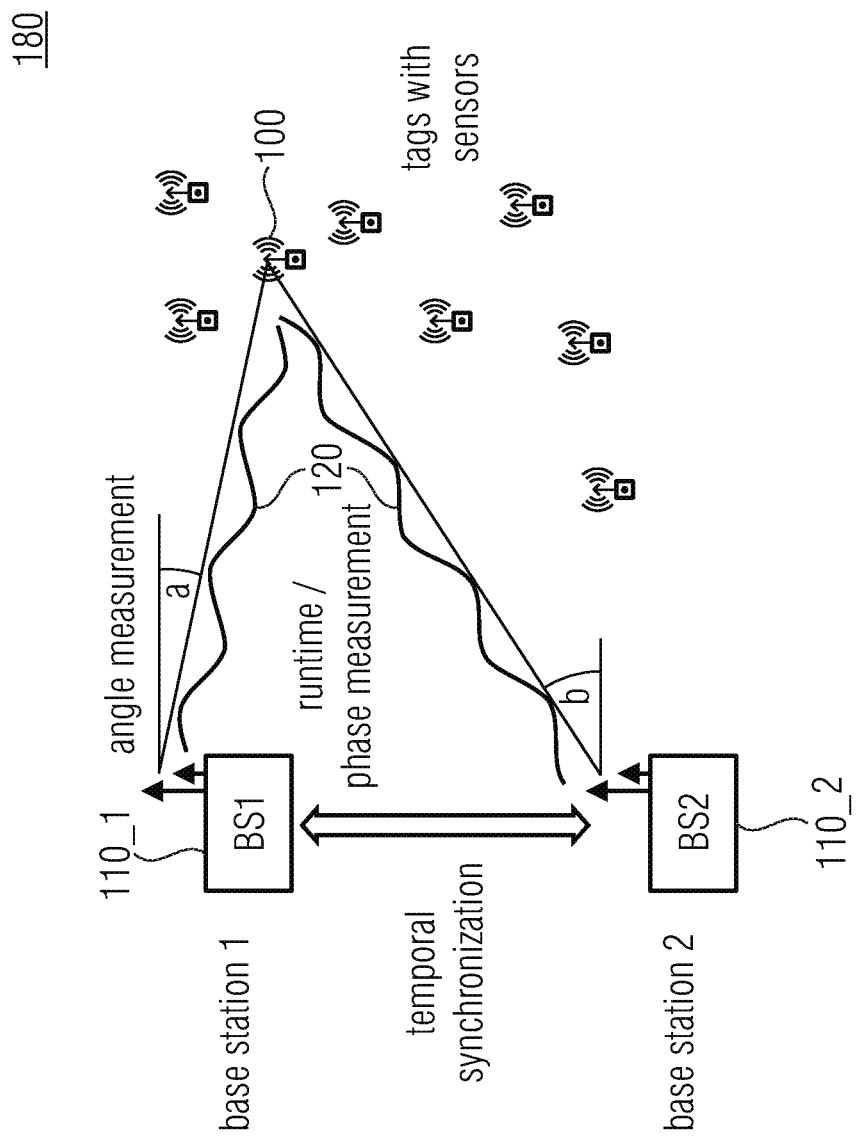
FIG. 8 shows a schematic view of a communication system with several sensor nodes and two base stations, according to an embodiment.

FIG. 8 shows a schematic view of a communication system 180 having several sensor nodes (data transmitters) 100 and two base stations (data receivers) 110_1 and 110_2 according to an embodiment.

As shown in FIG. 8, the two base stations 110 may receive a signal 120 transmitted by one of the sensor nodes 100. The two base stations 110_1 and 110_2 may be configured to determine a position of the sensor node 100 relative to the two base stations 110_1 and 110_2 based on the above described phase measurement of the received signal 120.

In embodiments, the two base stations 110_1 and 110_2 may optionally be temporally synchronized. In this case, the position of the sensor node 100 may further, or additionally, be determined based on a propagation time measurement.

In other words, FIG. 8 shows an overview of a telemetry system in connection with localization. The telemetry waveform described herein (=distribution of the sub-data packets 142_1 to 142_n in time and/or in frequency) supports the multipath-resistant accurate angular measurement and propagation time measurement of the sensor nodes (e.g. tags) 100. The sensor nodes 100 transfer sensor information to the base stations 110_1 and 110_2 and/or may be localized. If the first base station (BS1) 110_1 is not temporally synchronized with the second base station (BS2) 110_2, localization may be carried out by an angular measurement and triangulation. If the first base station (BS1) 110_1 is temporally synchronized with the second base station (BS2) 110_2, the localization (in addition to the angular measurement) may be carried via a propagation time measurement.

Underlying Design of the Telemetry System

In embodiments, e.g., the data transmitter 100 may be a sensor node (SK). For example, the sensor node may comprise a unit for energy harvesting, a battery or any other power supply. The sensor node 100 transfers data to a data receiver.

In embodiments, the data receiver 110 may be a base station (BS). The base station is connected to the other base stations and, if applicable, to a monitoring and service node (i.e. to an overall core network), in a wired (cable or fiberglass) or wireless manner.

In embodiments, the telemetry system may be unidirectional, i.e. data is only transferred from the sensor node to the base station, or bidirectional, i.e. data is transferred from the sensor node to the base station and also from the base station to the sensor node.

In the following, the transmissions are only transferred from the sensor node 100 to the base station.

Underlying Design of the Localization System

In embodiments, the localization of the telemetry transmitter (sensor node) 100 may be adapted to the transmitted signals. Spatially distributed receivers 110 may recognize the signal 120 received via antennas (e.g. through a preamble or another training signal pattern) and digitally sample the same. Due to the typically low bandwidth of a hop (sub-data packet), a propagation time measurement is not possible with sufficient accuracy and robustness. Therefore, the signal is considered as a whole across several hops (sub-data packets). This increases the overall signal bandwidth that may be used.

Considering the frequency hops, the (frequency) flat channel may be estimated in each receiver 110. For example, the channel may be sampled in a temporally-successive manner in the frequency region. Due to the narrowband nature of the overall signal in comparison to the carrier frequency, the narrowband approximation applies and the free-space path loss $A(f,d) = A_0(d)$ may also be assumed to be constant across the frequency (however, not across the distance d).

For each reception path/of the multi-path channel, phase ramps of the channel result in the frequency region (discrete frequencies $f_k$) according to the delay (path delay) of the signal:

$$h_{l,n}(f_k,\tau) = A_0(d_l)\exp[j2\pi f_k \tau + \varphi_n]$$

wherein $\varphi\_n$ indicates the initial phase difference between the transmitter and the n-th receiver. For example, from the slope of the described phase ramp, the delay (path delay) $\tau$ may be derived. In multi-path propagations, an overlap $$h_n(f_k,\tau) = \sum_{n=0}^{N-1} h_{l,n}(f_k,\tau)$$

arises as a result, so that signals of different delays (path delays) overlap and may also be estimated, e.g. based on the MUSIC algorithm [Fock, G., Meyr, H., Schulz-Rittich, P., & Schenke, A. "Low complexity high resolution subspace-based delay estimation for DSCDMA." IEEE International Communications Conference, ICC 2002.]. The relevant delay of a direct path (line of sight, LOS) is then the smallest delay, i.e. the delay of the first incoming/detectable path. In the case of a non-line of sight (NLOS), a systematically falsified estimation which may be intercepted in the position estimation arises as a result. This may be done by NLOS detection and rejecting the NLOS signal as well as by temporally tracking the (first and possibly second) detour path before and during occlusion.

In contrast to the classical approach, wherein, in the temporal region, a correlation is performed in all receivers 110 across the entire expected signal (i.e. across all hops (sub-data packets)) in order to detect the first path, in some embodiments, the delay of different spatially distributed receivers 110 is compared to derive the position (of the data transmitter 100). The arrangement and synchronization of the receiver 110 determines the localization approach to be followed.

According to a first localization approach, provided that the antennas are spatially distributed and the receivers are temporally synchronous, a TDOA method (time difference of arrival, a measurement of propagation time difference, wherein the propagation time difference of a time stamp is measured) may be used.

According to a second localization approach, provided the antennas are arranged closely together and the receivers 110 are time/phase-synchronized, a DOA method (direction of arrival) may be used.

According to a third localization approach, provided the antennas are distributed and the receivers 110 are time/phase-synchronized, a phase TDOA (ambiguities) may be used if the sampling data is additionally centrally collected, or a direct positioning method [N. Hadaschik, B. Sackenreuter, M. Schäfer and M. Faßbinder, "Direct positioning with multiple antenna arrays," 2015 International Conference on Indoor Positioning and Indoor Navigation (IPIN), Banff, Canada, 2015.] based on phase measurements and modulation measurements (ambiguities) may be used.

Obviously, combinations of the above mentioned localization approaches may be used, e.g. ambiguities occurring in phase measurements may be resolved by DOA and TDOA measurements.

In case of a noisy (phase) modulated signal, in a first step, the sub-data packets may be detected and demodulated based on their known synchronization symbols (sync symbols). In a second step, the data symbols may be decoded. With this, their originally noiseless phases (in phase/frequency modulation) are known. In a third step, these phase offsets may again be used for localization, as shown in FIG. 9.

Figure 9:
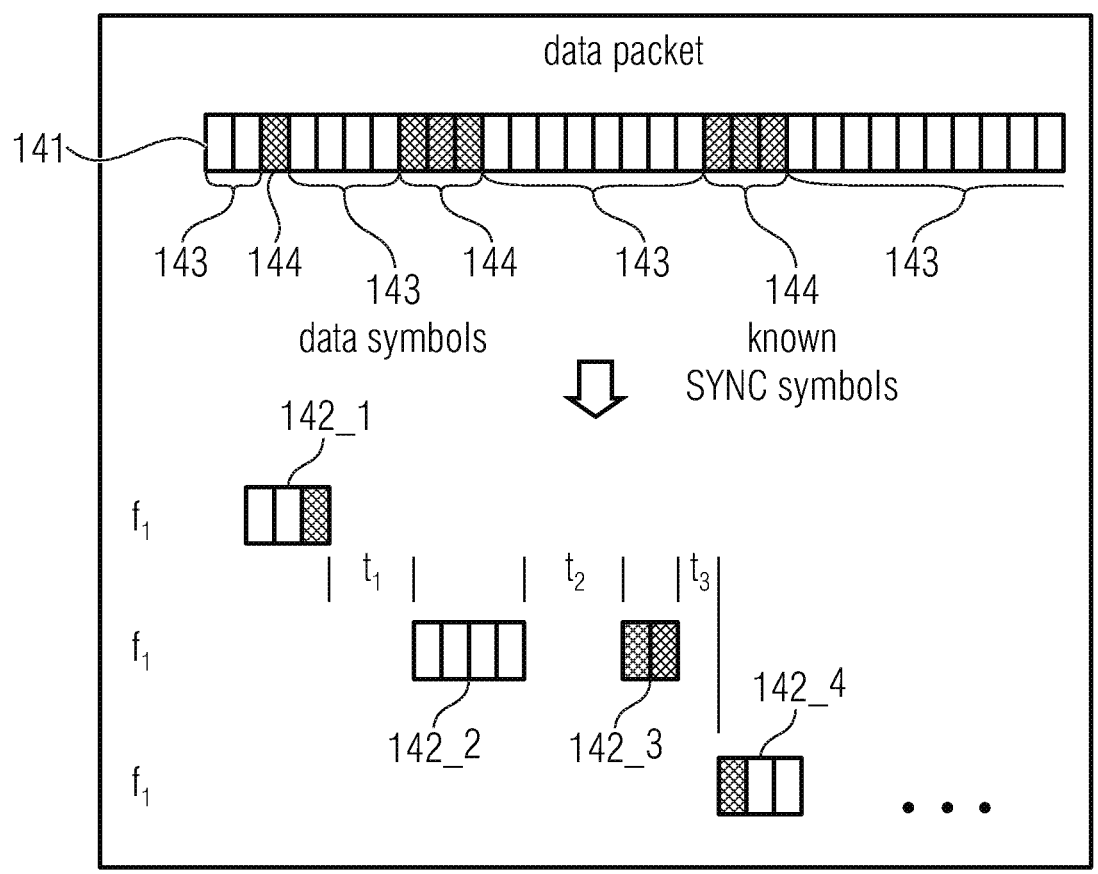
FIG. 9 shows a schematic view of a data packet and its division into a plurality of sub-data packets distributed in time and in frequency, according to an embodiment.

FIG. 9 shows a schematic view of a data packet 141 as well as a division of the same into a plurality of sub-data packets 142_1 to 142_n distributed in time and frequency. The data packet 141 may comprise both data symbols 143 and also synchronization symbols 144.

As can be seen in FIG. 9, the data packet 141 may be divided into the plurality of sub-data packets 142_1 to 142_n such that the plurality of sub-data packets 142_1 to 142_n each include a part of the data symbols and/or part of the synchronization symbols.

For example, a first sub-data packet 142_1 may include two data symbols and one synchronization symbol, while a second sub-data packet 142_2 may include four data symbols, while a third sub-data packet 142_3 may include two synchronization symbols and while a fourth sub-data packet 142_4 may include two data symbols and one synchronization symbol.

In addition, the sub-data packets 142_1 to 142_n may be distributed in the frequency.

For example, the first sub-data packet 142_1 may be transmitted on a first frequency f1, while the second sub-data packet 142_2 and the third sub-data packet 142_3 may be transmitted on a second frequency f2, while the fourth sub-data packet 142_4 may be transmitted on a fourth frequency f3.

The sub-data packets 142_1 to 142_n may further be distributed in time so that there are transmission pauses between the sub-data packets 142_1 to 142_n, in which nothing is transmitted. For example, a first transmission pause t1 may be present between the first and second sub-data packets 142_1 and 142_2, wherein a second transmission pause may be present between the second and third sub-data packets 142_2 and 142_3 and wherein a third transmission pause t3 may be present between the third and fourth sub-data packets 142_3 and 142_4. The transmission pauses may be of the same length or of different lengths.

In embodiments, the directly selected and known signal form may be taken into account.

Further Embodiments

Embodiments provide a communication system with a corresponding wave form that is suitable for localization. The communication system is characterized in that the data packet to be transferred is distributed to sub-packets having at least one symbol per sub-packet which is modulated onto a carrier frequency f1 and in that further sub-packets having at least one symbol are transmitted on the further carrier frequencies f2, . . . fn. Furthermore, the communication system is characterized in that the sub-packets may be transferred temporally spaced apart in order to reduce the sensitivity to interference and the multi-path resistance. Furthermore, the communication system is characterized in that the frequency intervals fn-fn−1 are variable, but are known to the receiver. Furthermore, the communication system is characterized in that the time intervals tn-tn−1 are variable, but are known to the receiver.

In embodiments, a distribution of the sub-packets (sub-data packets) may be carried out according to the following rules. In order to increase the localization accuracy, the carriers may be transmitted in a cumulated manner at the band edges. In order to increase the multipath resolution, the carriers may be distributed more regularly in the band. Alternatively, the distribution may also be carried out in an adaptive manner according to the channel properties.

In embodiments, the determination of the distance between base stations and sensor nodes may be carried out via a measurement of phase differences of different sub-packets (sub-data packets) in synchronized base stations.

In embodiments, the frequency hops may be coherent. A calibration of the phase offset of the PLL may be carried out when switching the carrier frequency, and compensation in the transmitter or receiver may be carried out. Furthermore, the sensor node may measure the phase offset of its TX hop (sent sub-data packet) in contrast to the previous hop (previously transmitted sub-data packet) by means of an SDR receiver which simultaneously receives and coherently remains on a frequency (e.g. within a bandwidth of 10 kHz, then it would have to change its frequency). A FFT calculation may be carried out and the measured phase offset may then be transmitted to the base station. Provided the coherency is not given, phase errors may be compensated through forming a phase difference of different base stations.

In embodiments, a phase measurement may be carried out based on known synchronization symbols. The use of the data symbols for the phase measurements by means of decoding and recoding the data packets.

Figure 10:
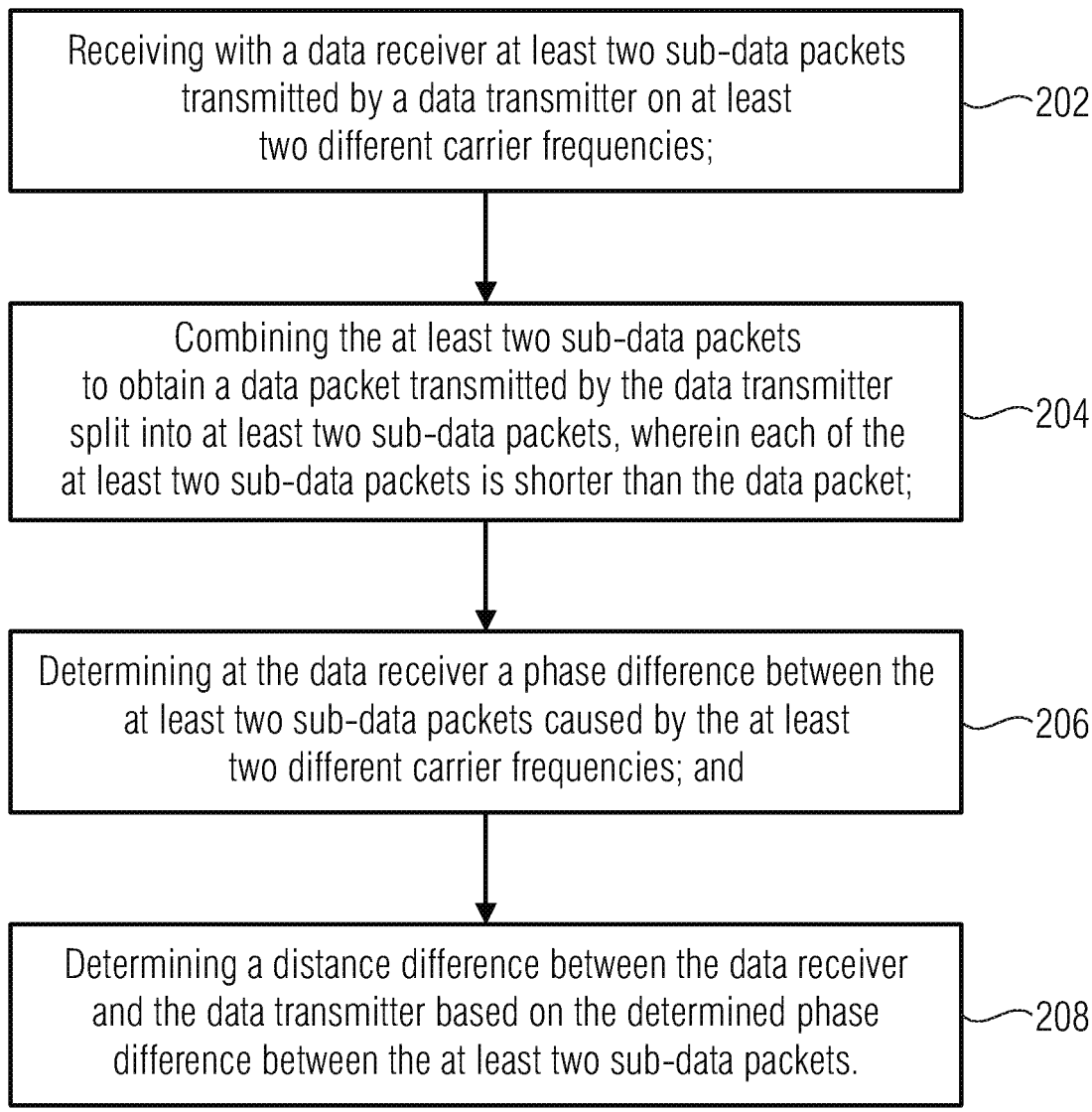
FIG. 10 shows a flow diagram of a method for determining a distance difference between a data transmitter and a data receiver, according to an embodiment.

FIG. 10 shows a flow diagram of a method 200 for determining a distance difference between a data receiver and a data transmitter according to an embodiment. The method 200 includes a step 202 of receiving with a data receiver at least two sub-data packets which are transmitted by a data transmitter on at least two different carrier frequencies. Furthermore, the method 200 includes a step 204 of combining the at least two sub-data packets to obtain a data packet transmitted split into the at least two sub-data packets by the data transmitter, wherein each of the at least two sub-data packets is shorter than the data packet. Furthermore, the method 200 includes a step 206 of determining at the data receiver a phase difference between the at least two sub-data packets that is caused by the at least two different carrier frequencies and the path delay. Furthermore, the method 200 includes a step 208 of determining a distance difference between the data receiver and the data transmitter based on the determined phase difference between the at least two sub-data packets.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A data receiver comprising:
a unit for receiving sub-data packets, configured to receive at least two sub-data packets from a data transmitter and to combine the at least two sub-data packets to acquire a data packet with data that is transmitted split into the at least two sub-data packets by the data transmitter, wherein each of the at least two sub-data packets is shorter than the data packet, wherein the unit for receiving sub-data packets is configured to receive the at least two sub-data packets on at least two different carrier frequencies;
a unit for determining a phase difference, configured to determine a phase difference between the at least two sub-data packets that is caused by the at least two different carrier frequencies and the path delay; and
a unit for determining a distance difference between the data receiver and the data transmitter based on the determined phase difference between the at least two sub-data packets);
wherein the data receiver knows the at least two different carrier frequencies or a frequency interval between the at least two different carrier frequencies;
wherein the unit for receiving sub-data packets is configured to receive the at least two sub-data packets at least at two different reception times;
wherein the data receiver knows the at least two different reception times or a temporal interval between the at least two different reception times;

wherein an interval between the at least two reception times is at least large enough so that the at least two sub-data packets are received temporally spaced apart from each other.

2. The data receiver according to claim 1, wherein the at least two different carrier frequencies are adjacent to frequency edges of a frequency band used for the transfer.

3. The data receiver according to claim 1, wherein the at least two different carrier frequencies are evenly distributed within a frequency band used for the transfer.

4. The data receiver according to claim 1, wherein a frequency hop between the at least two different carrier frequencies is coherent.

5. The data receiver according to claim 1, wherein the unit for determining the phase difference is configured to compensate a data transmitter-side phase offset that is caused by switching between the at least two carrier frequencies.

6. The data receiver according to claim 5, wherein at least one of the at least two sub-data packets or a further sub-data packet comprises the data transmitter-side offset.

7. The data receiver according to claim 1, wherein the unit for determining the phase difference is configured to, by using known synchronization symbols of the sub-data packets, measure a phase or a phasor of the respective sub-data packets.

8. The data receiver according to claim 1, wherein the unit for determining the phase difference is configured to perform decoding and recoding data symbols of the sub-data packets to measure a phase or a phasor of the respective sub-data packets.

9. A communication system comprising:
a data transmitter with a unit for generating sub-data packets, configured to split a data packet with data into at least two sub-data packets, wherein each of the at least two sub-data packets is shorter than the data packet, and a unit for transmitting sub-data packets, configured to transmit the at least two sub-data packets to the data receiver on at least two different carrier frequencies;
a data receiver with a unit for receiving sub-data packets, configured to receive the at least two sub-data packets from the data transmitter and to combine the at least two sub-data packets to acquire the data packet with data that is transmitted split into the at least two sub-data packets by the data transmitter, wherein the unit for receiving sub-data packets is configured to receive the at least two sub-data packets on at least two different carrier frequencies;
a unit for determining a phase difference, configured to determine a phase difference between the at least two sub-data packets that is caused by the at least two different carrier frequencies and the path delay; and
a unit for determining a distance difference between the data receiver and the data transmitter based on the determined phase difference between the at least two sub-data packets;
wherein the unit for transmitting data packets is configured to transmit the at least two sub-data packets at least at two different transmission times so that the at least two sub-data packets are temporally spaced apart from each other.

10. The communication system according to claim 9, wherein the data receiver comprises the unit for determining the phase difference, or wherein the communication system comprises a central processing unit comprising the unit for determining the phase difference.

11. The communication system according to claim 9, wherein the data receiver comprises the unit for determining the distance difference, or wherein the communication system comprises a central processing unit comprising the unit for determining the distance difference.

12. The communication system according to claim 9, wherein the unit for transmitting data packets is configured to transmit the at least two sub-data packets on the at least two different carrier frequencies that are adjacent to frequency edges of a frequency band used for the transfer.

13. The communication system according to claim 9, wherein the unit for transmitting data packets is configured to transmit the at least two sub-data packets on the at least two different carrier frequencies that are evenly distributed within a frequency band used for the transfer.

14. The communication system according to claim 9, wherein the unit for transmitting data packets is configured to transmit the at least two sub-data packets on the at least two different carrier frequencies that are adapted to properties of the communication channel.

15. The communication system according to claim 9, wherein the data transmitter comprises a unit for receiving sub-data packets, configured to receive the at least two sub-data packets that are transmitted by the data transmitter itself, and to measure a phase offset between the at least two sub-data packets;
wherein the unit for transmitting sub-data packets is configured to transmit to the data receiver an additional data packet comprising the measured phase offset;
wherein the unit for determining the phase difference in the data receiver is configured to compensate the received data transmitter-side phase offset when determining the phase difference between the at least two sub-data packets.

16. The communication system according to claim 9, wherein the unit for transmitting sub-data packets of the data transmitter is configured to distribute the sub-data packets irregularly in time and/or in frequency.

17. The communication system according to claim 9, wherein the communication system comprises a further data receiver with a further unit for receiving sub-data packets, configured to receive the at least two sub-data packets from the data transmitter, and to combine the at least two sub-data packets to acquire the data packet that is transmitted split into the at least two sub-data packets by the data transmitter, wherein the further unit for receiving sub-data packets is configured to receive the at least two sub-data packets on at least two different carrier frequencies;
wherein the unit for determining the phase difference or a further unit for determining a phase difference is configured to determine a further phase difference between the at least two sub-data packets that is caused by the at least two different carrier frequencies; and
a unit for determining a further distance difference between the further data receiver and the data transmitter based on the determined further phase difference between the at least two sub-data packets;
wherein the communication system comprises a unit for determining a position of the data transmitter, configured to determine a position of the data transmitter based on the determined phase difference and the determined further phase difference or based on the determined distance difference and the determined further distance difference.

18. The communication system according to claim 9, wherein the data receiver and the further data receiver are temporally synchronized.

19. A communication system comprising:
a data transmitter with a unit for generating sub-data packets, configured to split a data packet with data into at least two sub-data packets, wherein each of the at least two sub-data packets is shorter than the data packet, and a unit for transmitting sub-data packets, configured to transmit the at least two sub-data packets to the data receiver on at least two different carrier frequencies;
a data receiver with a unit for receiving sub-data packets, configured to receive the at least two sub-data packets from the data transmitter and to combine the at least two sub-data packets to acquire the data packet with data that is transmitted split into the at least two sub-data packets by the data transmitter, wherein the unit for receiving sub-data packets is configured to receive the at least two sub-data packets on at least two different carrier frequencies;
a further data receiver with a further unit for receiving sub-data packets, configured to receive the at least two sub-data packets from the data transmitter, and to combine the at least two sub-data packets to acquire the data packet that is transmitted split into the at least two sub-data packets by the data transmitter, wherein the further unit for receiving sub-data packets is configured to receive the at least two sub-data packets on at least two different carrier frequencies;
a unit for determining a phase difference, configured to determine a phase difference between the at least two sub-data packets that is caused by the at least two different carrier frequencies and the path delay, wherein the unit for determining the phase difference or a further unit for determining a phase difference is configured to determine a further phase difference between the at least two sub-data packets that is caused by the at least two different carrier frequencies;
wherein the communication system comprises a unit for determining a position of the data transmitter, configured to determine a position of the data transmitter based on the determined phase difference and the determined further phase difference;
wherein the data receiver and the further data receiver are temporally synchronized.

20. A method comprising:
receiving with a data receiver at least two sub-data packets that are transmitted by a data transmitter on at least two different carrier frequencies;
combining the at least two sub-data packets to acquire a data packet with data that is transmitted split into the at least two sub-data packets by the data transmitter, wherein each of the at least two sub-data packets is shorter than the data packet;
determining at the data receiver a phase difference between the at least two sub-data packets that is caused by the at least two different carrier frequencies and the path delay; and
determining a distance difference between the data receiver and the data transmitter based on the determined phase difference between the at least two sub-data packets;
where the at least two different carrier frequencies or a frequency interval between the at least two different carrier frequencies is known;
wherein the at least two sub-data packets are received at least at two different reception times;
where the at least two different reception times or a temporal interval between the at least two different reception times is known;
wherein an interval between the at least two different reception times is at least large enough so that the at least two sub-data packets are received temporally spaced apart from each other.

21. The method according to claim 20, further comprising:
receiving the at least two sub-data packets with a further data receiver;
determining at the further data receiver a further phase difference between the at least two sub-data packets that is caused by the at least two different carrier frequencies; and
determining a distance difference between the further data receiver and the data transmitter based on the determined further phase difference between the at least two sub-data packets; and
determining a position of the data transmitter relatively to the data receiver and the further data receiver based on the determined phase difference and the further phase difference.

22. A non-transitory digital storage medium having a computer program stored thereon to perform the method comprising:
receiving with a data receiver at least two sub-data packets that are transmitted by a data transmitter on at least two different carrier frequencies;
combining the at least two sub-data packets to acquire a data packet with data that is transmitted split into the at least two sub-data packets by the data transmitter, wherein each of the at least two sub-data packets is shorter than the data packet;
determining at the data receiver a phase difference between the at least two sub-data packets that is caused by the at least two different carrier frequencies and the path delay; and
determining a distance difference between the data receiver and the data transmitter based on the determined phase difference between the at least two sub-data packets;
where the at least two different carrier frequencies or a frequency interval between the at least two different carrier frequencies is known;
wherein the at least two sub-data packets are received at least at two different reception times;
where the at least two different reception times or a temporal interval between the at least two different reception times is known;
wherein an interval between the at least two different reception times is at least large enough so that the at least two sub-data packets are received temporally spaced apart from each other,
when said computer program is run by a computer.

* * * * *